C. MERCHANT.
FOOT CONTROL FOR MOTOR CYCLES.
APPLICATION FILED JULY 29, 1913.

1,102,940.

Patented July 7, 1914.

Witnesses
W. S. McDowell
P. M. Smith

Inventor
Charles Merchant,
By Victor J. Evans
Attorney

UNITED STATES PATENT OFFICE.

CHARLES MERCHANT, OF OTTAWA, KANSAS.

FOOT CONTROL FOR MOTOR-CYCLES.

1,102,940. Specification of Letters Patent. Patented July 7, 1914.

Application filed July 29, 1913. Serial No. 781,823.

*To all whom it may concern:*

Be it known that I, CHARLES MERCHANT, a citizen of the United States, residing at Ottawa, in the county of Franklin and State of Kansas, have invented a new and useful Foot Control for Motor-Cycles, of which the following is a specification.

This invention relates to foot controls for motor-cycles, the object in view being to provide a simple device by means of which the operator of a motorcycle may start the machine in a reliable manner without danger of stalling the engine by throwing in the clutch too suddenly, the device of this invention providing for shifting the clutch to a point where it will take hold and yet allow a certain amount of slippage of the flexible driving element through the medium of which the power of the engine is transmitted to the driving wheel of the machine.

A further object of the invention is to provide means for adjusting the extent to which the clutch may be shifted for the purpose stated.

With the above and other objects in view, the invention consists in the construction, combination and arrangement of parts, as will hereinafter be more fully described, illustrated and claimed.

Figure 1:
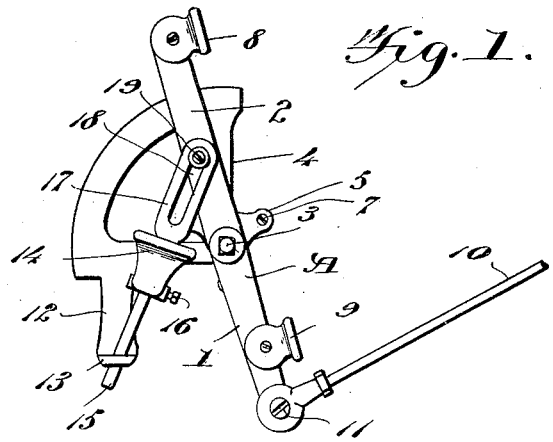
Figure 2:
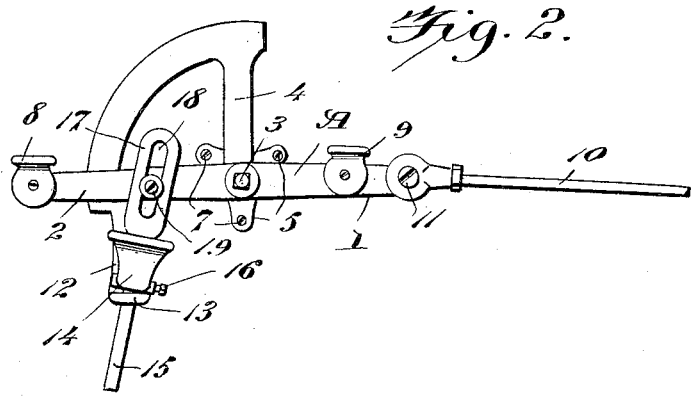
Figure 3:
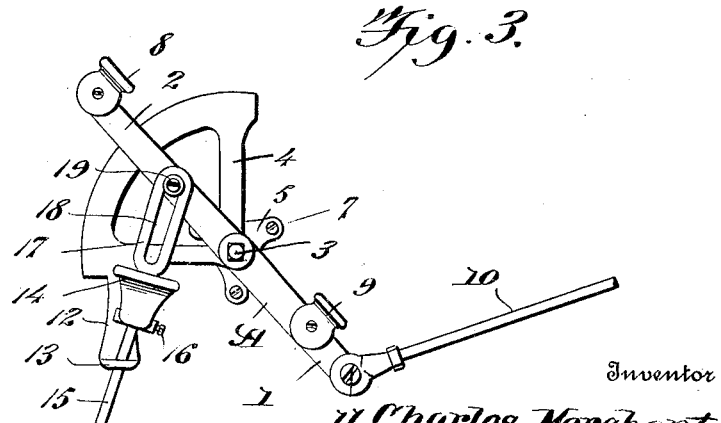

In the accompanying drawings: Figure 1 is a side elevation of the device of this invention showing the position assumed by the parts when the clutch is thrown entirely out of operation. Fig. 2 is a similar view showing the position assumed by the parts when the clutch is thrown in to the full extent. Fig. 3 is a similar view showing the position assumed by the parts when the starting pedal is depressed and the clutch thrown into position for starting the machine without stalling the engine.

The device contemplated in this invention comprises essentially a clutch shifting lever designated generally by the reference character A, said lever comprising two arms 1 and 2, the lever being fulcrumed about centrally of its length at 3 on a bracket 4 shown as provided with a pair of lugs 5 by means of which it may be secured with the aid of bolts 7 or their equivalent to the frame of the motorcycle in fixed relation thereto.

The lever A is provided adjacent to its opposite ends with pedals 8 and 9, the pedal 8 being adapted for use to throw the clutch into its fully operative position while the pedal 9 is used for throwing the clutch out and the pedals 8 and 9 are secured to their respective arms of the lever A in fixed relation to the latter.

10 designates the clutch operating rod which is pivotally connected to 11 to one arm of the lever A.

The bracket 4 is provided with an extension 12 terminating in an outwardly projecting perforated lug or eye 13 which constitutes a guide for the stem of the starting pedal hereinafter described and also a stop for limiting the throw of said pedal.

14 designates the starting pedal which is provided with a stem 15 slidable through the combined guide and stop 13. The pedal 14 is adjustable lengthwise of the stem 15 by means of a set screw 16 so as to increase or diminish the throw of the starting pedal, thereby giving a greater or less movement to the lever A as will appear. The stem 15 is provided at one end with a compensating or gage link 17 longitudinally slotted as at 18 to receive a bolt or screw 19 which bears a fixed relation to and is carried by the arm 2 of the lever A.

From the foregoing description it will now be understood that when the operator presses downwardly on the pedal 9, he pulls on the rod 10 and moves the clutch out of its operative position. When he presses downwardly on the pedal 8, by means of the rod 10 the clutch is thrown into its fully operative position. In order to start the machine, the operator presses downwardly on the starting pedal 14 whereupon the lever A is moved through a predetermined part of its complete stroke, sufficient to throw the clutch partly into operation or in other words so as to cause the clutch to partially tighten the belt or other flexible connection by which the power of the engine is transmitted to the driving wheel. The extent to which the arm 2 of the lever A is depressed by the starting pedal 14 is regulated by adjusting said pedal along the stem 15 thereby increasing or diminishing the distance between the starting pedal and the stop 13. After the machine has attained the necessary headway, the operator presses downwardly on the pedal 8 thereby throwing the clutch into its fully operative position, such additional depressing movement of the lever A not being interfered with by reason of the slot 18 in the compensating link 17.

What I claim is:—

1. A foot control for motorcycles, embodying a two armed lever, a pedal on each arm of said lever, a clutch-operating rod attached to one arm of said lever, an auxiliary starting pedal, and a link connecting the last named pedal with said lever, said link and lever having a limited amount of free relative play for the purpose specified.

2. A foot control for motorcycles, embodying a two armed lever, a pedal on each arm of said lever, a clutch-operating rod attached to one arm of said lever, an auxiliary starting pedal, a link connecting the last named pedal with said lever, said link and lever having a limited amount of free relative play for the purpose specified, a stop for said starting pedal, and means for regulating the throw of said starting pedal.

3. A foot control for motorcycles, embodying a two armed lever, a pedal on each arm of said lever, a clutch-operating rod attached to one arm of said lever, an auxiliary starting pedal, a link connecting the last named pedal with said lever, said link and lever having a limited amount of free relative play for the purpose specified, a combined guide and stop for said starting pedal, and means for regulating the throw of said starting pedal.

4. A foot control for motorcycles embodying a two armed lever, a pedal on each arm of said lever, a clutch operating rod attached to one arm of said lever, an auxiliary starting pedal, a link connecting the last named pedal with said lever, said link and lever having a limited amount of relative play for the purpose specified, a combined guide and stop for said starting pedal, means for regulating the throw of said starting pedal and a bracket or device for holding the foot clutch to the engine.

In testimony wheref I affix my signature in presence of two witnesses.

CHARLES MERCHANT.

Witnesses:
JAMES BALL,
H. F. ELLIS.

---

Copies of this patent may be obtained for five cents each, by addressing the "Commissioner of Patents, Washington, D. C."